United States Patent [19]
Laimböck et al.

[11] Patent Number: 5,379,738
[45] Date of Patent: Jan. 10, 1995

[54] FOUR-STROKE CYCLE INTERNAL COMBUSTION ENGINE

[76] Inventors: Franz Laimböck, Waldsdorfberg 86, A-8051 Thal Bei Graz, Austria; Alexander F. W. Fürschüss, Buchenstrasse 20, A-4481 Asten, Austria

[21] Appl. No.: 152,831

[22] Filed: Nov. 15, 1993

[30] Foreign Application Priority Data

Nov. 16, 1992 [AT] Austria .................. A 2262/92

[51] Int. Cl.$^6$ .................................. F02D 9/08
[52] U.S. Cl. .............................. 123/337; 123/308
[58] Field of Search .......... 123/52 ML, 52 MB, 79 A, 123/336, 337, 308, 190.1

[56] References Cited

U.S. PATENT DOCUMENTS

| | | | |
|---|---|---|---|
| 4,766,853 | 8/1988 | Iwanami | 123/208 |
| 4,854,270 | 8/1989 | Melde-Tuczai et al. | 123/308 |
| 4,930,468 | 6/1990 | Stockhausen | 123/308 |
| 4,932,378 | 6/1990 | Hitomi et al. | 123/308 |
| 5,311,848 | 5/1994 | Isaka et al. | 123/308 |

FOREIGN PATENT DOCUMENTS

| | | | |
|---|---|---|---|
| 2393934 | 2/1979 | France | 123/79 A |
| 2577646 | 10/1987 | France | |
| 3702827 | 8/1988 | Germany | |
| 3843690 | 7/1990 | Germany | |
| 60-93122 | 5/1985 | Japan | |
| 981660 | 7/1977 | U.S.S.R. | |

*Primary Examiner*—Willis R. Wolfe
*Assistant Examiner*—Erick Solis
*Attorney, Agent, or Firm*—Collard & Roe

[57] ABSTRACT

A four-stroke cycle internal combustion engine comprises at least two inlet valves and a correspondingly branched intake line. In order to ensure that a high power and a more favorable specific fuel combustion will be achieved at high speeds and a reduced fuel consumption and a lower emission of exhaust gas will be achieved particularly at low speeds and under partial loads. A rotary valve, which has at least two passages, which are associated with respective intake branch lines and are as straight as possible and lead to respective inlet valves, is provided downstream of the junction where the intake line is branched. The internal combustion engine also comprises at least one additional pipe section, which in one position of the rotary valve is connected by the rotary valve between one intake branch line and one of the passages which is then open whereas the rotary valve then shuts off the other passage or passages.

8 Claims, 4 Drawing Sheets

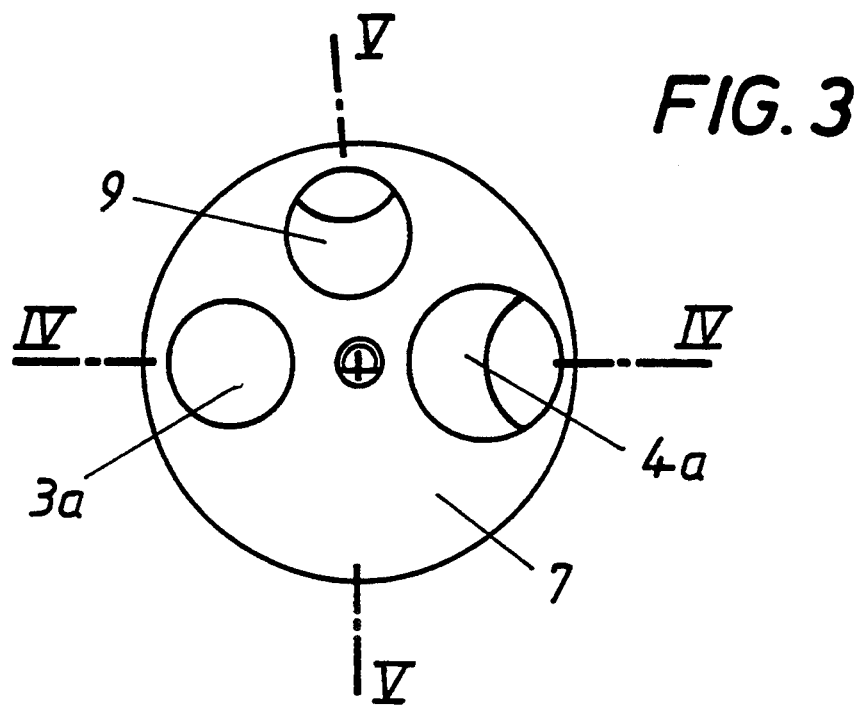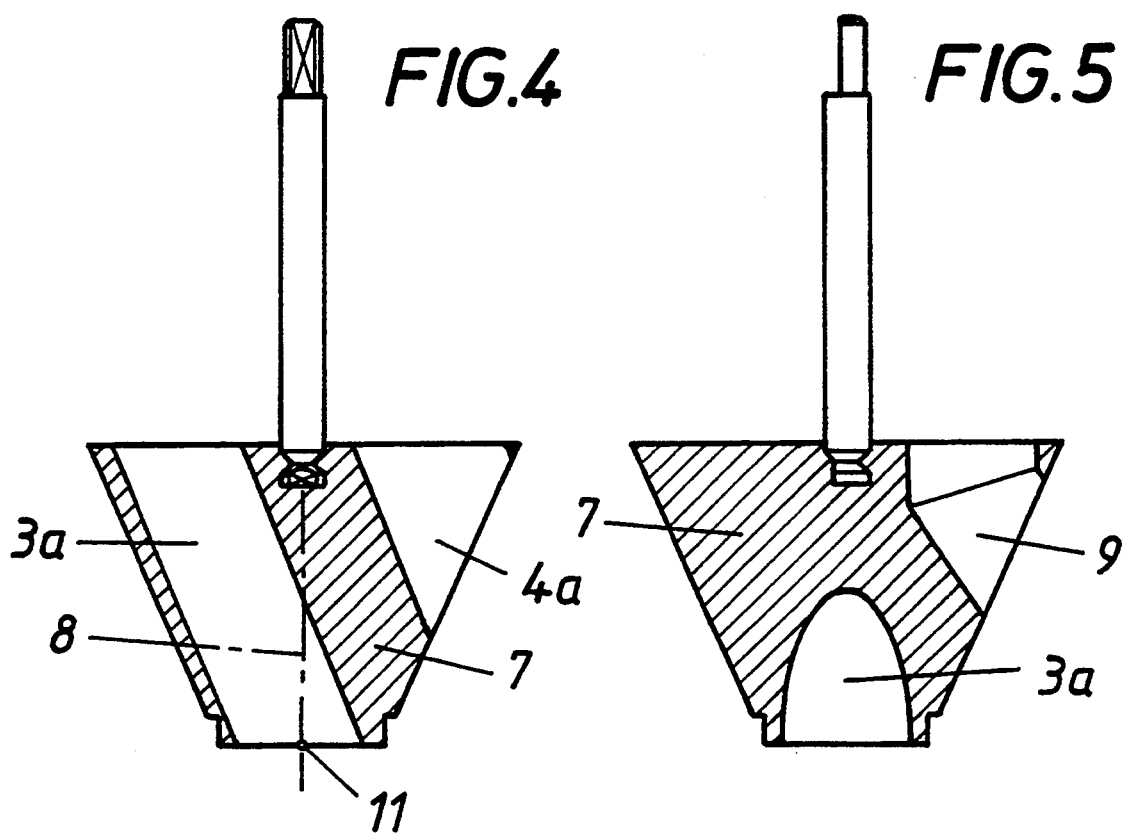

FOUR-STROKE CYCLE INTERNAL COMBUSTION ENGINE

BACKGROUND OF THE INVENTION

1. Field of the Invention

This invention relates to a four-stroke cycle internal combustion engine comprising at least two inlet valves, a branched intake line, which is connected to both let valves, and a rotary valve, which is incorporated in the intake line downstream of the junction therein and has at least two valve passages, which are associated with respective branch intake lines.

2. Description of the Prior Art

A four-stroke cycle internal combustion engine of that kind has been disclosed in SU Abstracts, Section Q, Q52Q53). In that engine the rotary valve is used to supply a rich mixture at a controlled rate through the small valve passage to an auxiliary combustion chamber and the valve passages are not switched.

SUMMARY OF THE INVENTION

It is an object of the invention so to improve such an internal combustion engine that a high power and a more favorable specific fuel combustion will be achieved at high speeds and a reduced fuel consumption and a lower emission of exhaust gas will be achieved particularly at low speeds and under partial loads.

That object is accomplished in accordance with the invention in that the valve passages are associated and lead to respective inlet valves, is provided downstream of the junction where the intake line is branched and that the internal combustion engine comprises at least one additional pipe section, which in one position of the rotary valve is connected by the rotary valve between one intake branch line and one of the valve passages which is then open whereas the rotary valve then shuts off the other valve passage or passages.

In the position for maximum load, the combustible gas is conducted by the valve passages of the rotary valve separately and on a short intake path which is as straight as possible and without being throttled so that the combustible gas is effectively sucked and the known ram induction is achieved. At low speeds and under light loads, only one of the valve passages is open to the associated inlet valve and the flow of air through the additional pipe section causes an additional pipe length to be included. In that case the combustible gas can flow only through one valve and because that valve is offset from the axis of the cylinder the intake charge will desirably swirl about the axis of the cylinder. Besides, the velocity of the as column in the single valve passage then employed will rise and the formation of a mixture will be improved by the higher turbulence and in combination with the longer intake path including the additional pipe section this will cause the gas column to have a higher inertia, and, as a result, the recharging will result in a higher volumetric efficiency.

According to a further feature of the invention the rotary valve comprises a solid of revolution, which tapers toward the inlet valves and is preferably frustoconical and has an axis which is oblique to the direction of flow of the gas. In that case the valve passages in the rotary valve can be designed for a minimum drag and the intake paths will be short in the position for higher speeds and for high loads. In that position the additional pipe section, i.e., the additional pipe length, is entirely shut off and cannot disturb the exchange of gas of the system which oscillates in the short intake path.

In order to provide a favorable arrangement and design of the valve passages in the rotary valve, the axis or axes of the valve passage or passages leading directly to the inlet valves lies or lie in a plane or planes which extend through the axis of the solid of revolution or frustum of a cone.

The design can further be improved in that the inlet openings of the valve passages and of a further passage leading to the additional pipe section extend in a plane which is normal to the axis of the solid of revolution or frustum of a cone and the center of the circular outlet opening of the constantly open valve passage, which opening lies also in such plane, lies on the axis of the solid of revolution or cone. As a result, any rotation of the rotary valve will not change the position of the outlet opening of the constantly open valve passage so that said opening will always communicate with the associated intake valves.

The constantly open valve passage, into which the additional pipe section opens, is smaller in diameter than the remaining valve passage or passages so that the velocity of flow in that passage is further increased during an operation under .partial loads and at low speeds.

It will also be desirable so to arrange the intake line sections leading from the rotary valve to the inlet valves that they produce swirls in mutually opposite senses. As a result, the swirls obtained when the rotary valve is in position for high loads will be eliminated in favor of a high turbulence in the combustion chamber. On the other hand, the swirl will be maintained during an operation under partial loads or at low speeds because gas is then supplied only through the one open passage.

The rotary valve is rotated by positioning means having a logic for mechanically or electrically effecting an automatic control of the position of the rotary valve in dependence on the actual operating conditions of the internal combustion engine, i.e., on its speed or load.

BRIEF DESCRIPTION OF DRAWINGS

FIGS. 3 to 5 are a top plan view and two sectional views taken through IV—IV and V—V, respectively, in FIG. 1 through the axis of the frustum of a cone and show a rotary valve.

DETAILED DESCRIPTION OF A PREFERRED EMBODIMENT

Figure 1:
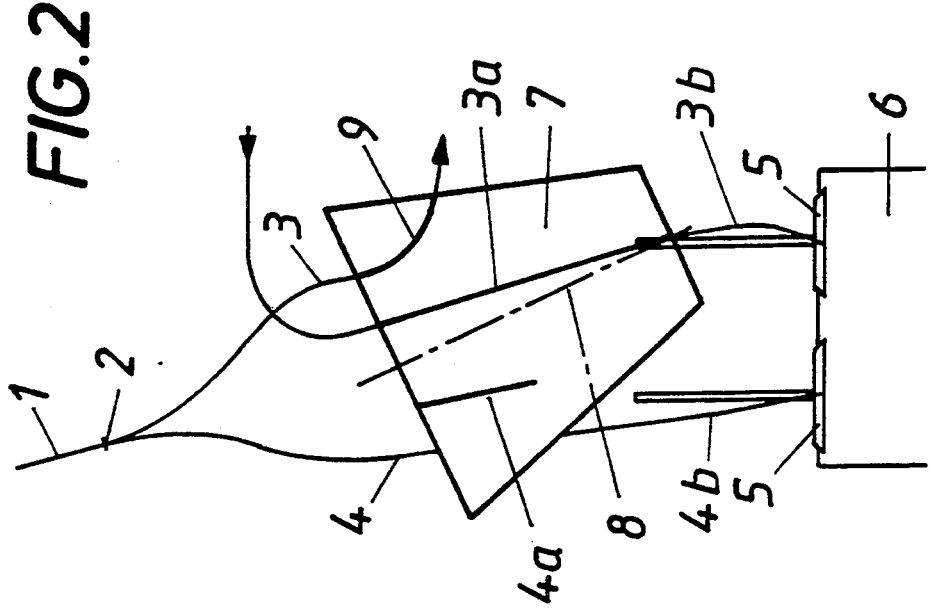
FIGS. 1 and 2 illustrate the scheme of the gas flow paths leading to the inlet valves at high speeds and at low speeds, respectively.

An illustrative embodiment of the invention will now be described more in detail with reference to the drawing.

Figure 2:
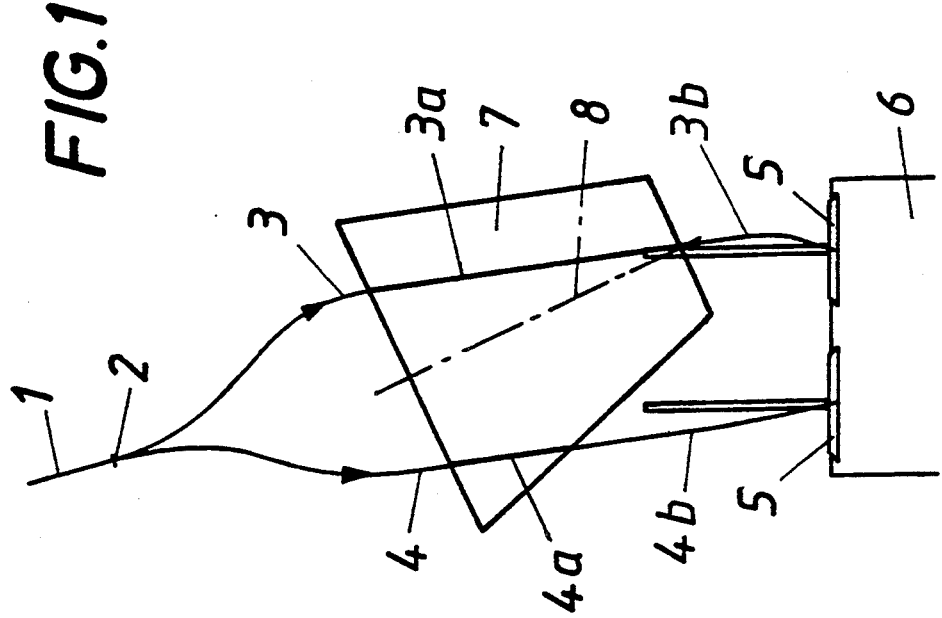

The intake line 1 coming from the carburetor branches at 2 into two intake branch lines 3 and 4. The cylinder 6 of the internal combustion engine is provided with two inlet valves 5. A rotary valve 7 consisting of a frustum of a cone is incorporated in the intake line downstream of the junction 2. The rotary valve 7 is formed with valve passages 3a, 4a, which continue respective intake branch lines 3, 4 and are as straight as possible. The valve passages 3a, 4a are oblique to the axis of rotation 8 of the rotary valve 7. For an operation at high speeds or under high loads the rotary valve 7 is in the angular position which is shown in FIG. 1 and in which the two inlet valves 5 are separately supplied with combustible gas through short intake paths, which include the two valve passages 3a, 4a and respective intake line sections 3b and 4b downstream of said valve passages. On the other hand, for an operation under light loads and at low speeds, the rotary valve 7 is rotated to the position which is shown in FIG. 2 and in which the rotary valve 7 shuts off the valve passage 4a and the combustible gas flows from the intake branch line 3 into a further passage 9, which leads to a pipe section that is not shown and is provided in the ternal combustion engine and opens into the valve passage 3a, which is open at that time. As a result, an additional pipe length is connected to the constantly open valve passage 3a.

Figure 6:
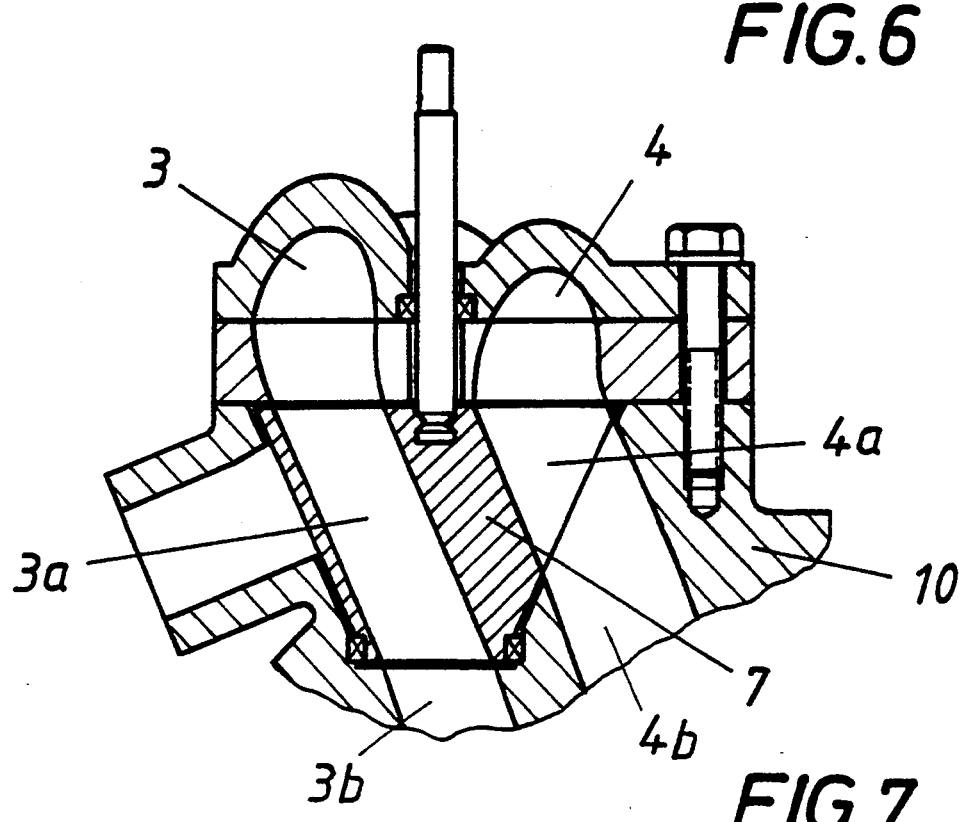
FIGS. 6 and 7 show the rotary valve, which is incorporated in the cylinder head of an internal combustion engine and is shown in its position for high powers and high speeds and in its position for low speeds.
Figure 7:
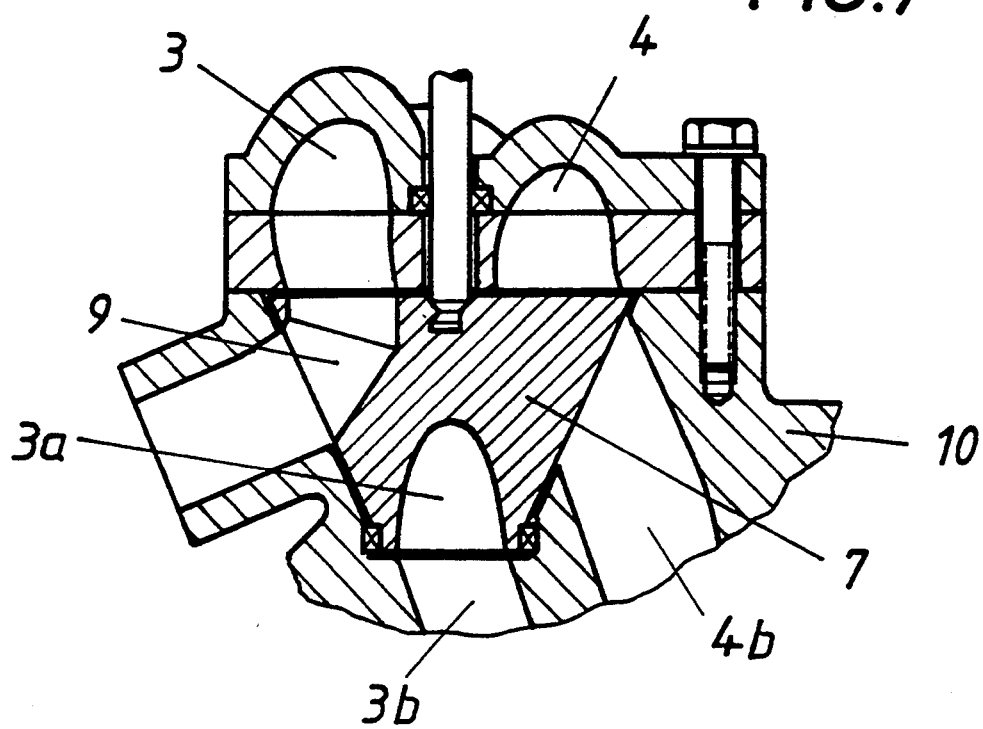
Figure 8:
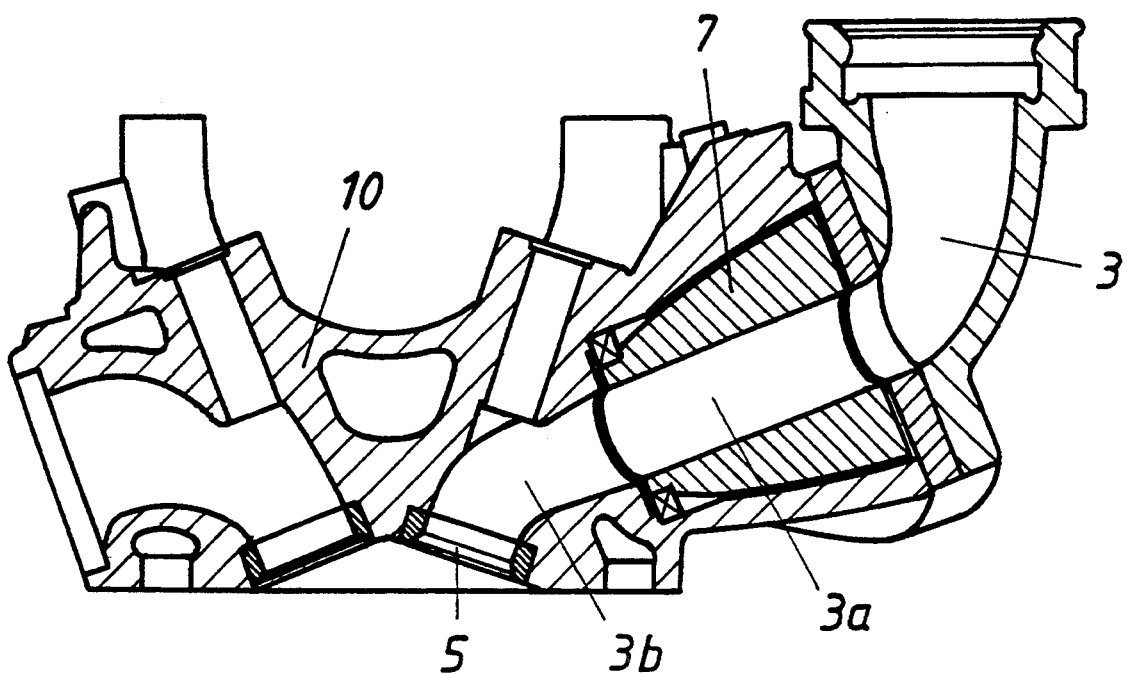
FIGS. 8 and 9 are sectional views taken on lines which extend on planes extending through the cylinder head through the center lines of the passages.
Figure 9:
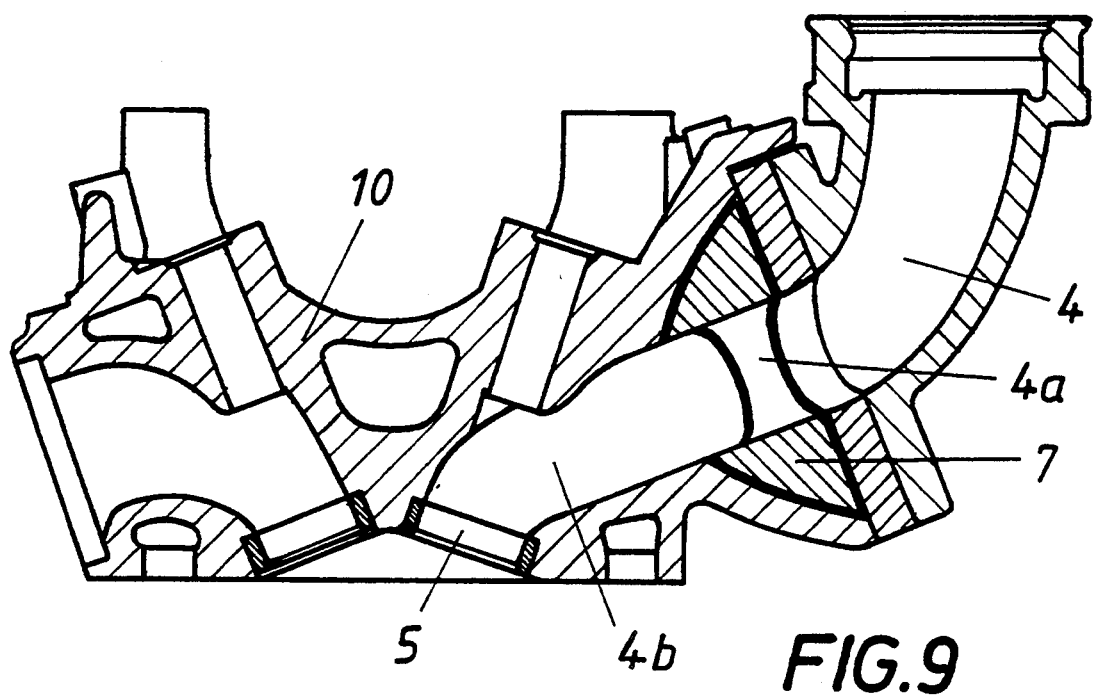

As is apparent from FIG. 3, the inlet openings of the valve passages 3a, 4a and of the further passage 9 are disposed in the rotary valve 7 in a plane which is normal to the axis of the frustum of a cone. The outlet openings of the valve passage 3a lies also in a plane which is normal to the axis of the frustum of a cone and that opening is circular and its center M lies on the axis 8 of the frustum of a cone 7 so that the position of that opening will not be changed by a rotation of the rotary valve. The three inlet openings of the passages 3a, 4a and 9 are spaced defined distances apart and the entire arrangement is such that both branch intake lines 3 and 4 are connected by the valve passages 3a and 4a and the intake line sections 3b and 4b to the inlet valves 5 and the further passage 9 is closed in the angular position shown in FIG. 1 and the valve passage 4a is closed and the additional passage 9 leads to the additional pipe section in the position shown in FIG. 2. This is due to the fact that the outlet openings of the two passages 4a, 9 are disposed on the conical surface so that they are closed by the valve seat or communicate with the inlet opening of the additional pipe section. This is distinctly apparent in FIGS. 6 and 7, which indicate the paths for the combustible gas at high and low speeds, respectively. The cylinder head is designated 10. The sectional views in FIGS. 8 and 9 show the parts installed in the cylinder head 10 when the rotary valve 7 is in the angular position for high speeds or under full load.

We claim:

1. In a four-stroke cycle internal combustion engine comprising
    at least one cylinder comprising at least two inlet valves,
    at least one intake line having a junction and at least two branch line sections extending downstream of said junction to respective ones of said intake valves of said cylinder, and
    at least one rotary valve, which is disposed in said intake line between said junction and said branch line sections and comprises at least two valve passages, which are associated with respective ones of said branch line sections and is rotatable to a plurality of positions and is arranged in one of said positions to connect said junction through one of said valve passages to the branch line section associated therewith and to shut off said junction from the other of said intake branch line sections,
    the improvement residing in that
    each of said valve passages is substantially straight,
    said engine comprises an additional pipe section, and
    said rotary valve is arranged to connect in a first one of said positions said junction through said pipe section and a predetermined one of said valve passages and the associated branch line section to a predetermined one of said inlet valves and to connect in another one of said positions said junction through said predetermined one and at least one additional one of said valve passages to the branch line sections associated therewith whereas said pipe section is then shut off from said valve passages.

2. The improvement set forth in claim 1 as applied to a four-stroke cycle internal combustion engine in which said rotary valve comprises a solid of revolution which tapers in the direction from said junction to said branch intake lines and is mounted to be rotatable about the axis of said solid of revolution and
    said valve passages are formed in said of revolution and include an acute angle with said axis.

3. The improvement set forth in claim 2, wherein said solid of revolution is a frustum of a cone.

4. The improvement set forth in claim 2, wherein said additional valve passage has an axis, and
    the axis of said additional valve passage and the axis of said solid of revolution extend in a common plane.

5. The improvement set forth in claim 2, wherein said pipe section has first and second opposite ends,
    said first end of said pipe section is connected to said junction, and
    said rotary valve has a further passage, which is permanently connected to said predetermined one of said valve passages and is arranged to be connected to said second end of said pipe section when said rotary valve is in said first position.

6. The improvement set forth in claim 5, wherein said valve passages and said further passage have inlet openings disposed in a plane which is normal to the axis of said solid of revolution, and
    said predetermined valve passage has a circular outlet opening, which is centered on the axis of said solid of revolution and extends in a plane which is normal to said axis so that said predetermined valve passage is permanently connected to the associated one of said branch line sections.

7. The improvement set forth in claim 2, wherein said predetermined valve passage is smaller in diameter than any other of said valve passages.

8. The improvement set forth in claim 1, wherein said branch line sections are arranged to produce swirls in mutually opposite senses in the gas discharged through said inlet valves into said cylinder when said rotary valve is in said other position.

* * * * *